(12) United States Patent
Horton

(10) Patent No.: US 7,028,981 B2
(45) Date of Patent: Apr. 18, 2006

(54) NON-RETURN VALVE

(75) Inventor: David R Horton, Drummoyne (AU)

(73) Assignee: IP.ONE PTY LTD, Sydney (AU)

( * ) Notice: Subject to any disclaimer, the term of this patent is extended or adjusted under 35 U.S.C. 154(b) by 0 days.

(21) Appl. No.: 10/018,056

(22) PCT Filed: Dec. 14, 2001

(86) PCT No.: PCT/AU00/00659

§ 371 (c)(1),
(2), (4) Date: Mar. 5, 2002

(87) PCT Pub. No.: WO00/77429

PCT Pub. Date: Dec. 21, 2000

(65) Prior Publication Data

US 2004/0211468 A1 Oct. 28, 2004

(30) Foreign Application Priority Data

Jun. 15, 1999 (AU) .......................... PQ4713
Aug. 23, 1999 (AU) .......................... PQ2387

(51) Int. Cl.
F16K 15/18 (2006.01)
F16K 15/16 (2006.01)

(52) U.S. Cl. .................. 251/149.1; 137/846; 137/512; 137/614.2

(58) Field of Classification Search ............ 137/512, 137/544, 550, 843, 846, 515, 614.2; 210/97, 210/136; 251/142, 149, 149.1, 155
See application file for complete search history.

(56) References Cited

U.S. PATENT DOCUMENTS

| | | | |
|---|---|---|---|
| 15,192 A * | 6/1856 | Peale ......................... | 137/844 |
| 274,447 A | 3/1883 | Kennish | |
| 996,588 A * | 6/1911 | Kennedy .................. | 137/515.7 |
| 2,644,663 A | 7/1953 | Klinger | |
| 2,830,610 A | 4/1958 | Chupa | |
| 3,485,419 A * | 12/1969 | Taylor ........................ | 222/494 |
| 3,822,720 A | 7/1974 | Souza | |
| 3,861,416 A | 6/1975 | Wichterle | |

(Continued)

FOREIGN PATENT DOCUMENTS

DE 40 33 818 A1 5/1991

(Continued)

Primary Examiner—Ramesh Krishnamurthy
(74) Attorney, Agent, or Firm—Stites & Harbison PLLC; Ross F. Hunt, Jr.

(57) ABSTRACT

A non-return valve (10), typically of commonly called duckbill valve shape, comprising a valve body (12) and a valve membrane (14). The valve body (12) is generally tubular and includes an elongate passageway (16) with inlet (18) and outlet (20) at opposing ends. The valve membrane (14) is of a generally conical-shaped diaphragm formed integrally with the valve body (12). The diaphragm (14) has a collapsible opening or aperture (22) located at or adjacent the cones apex. The conical diaphragm (14) is oriented with its apex pointing downstream. The resiliently flexible material from which the diaphragm (14) is constructed, ensures that the diaphragm (14) in a collapsed condition obstructs or closes the aperture (22) to prevent fluid flowing in a reverse direction, i.e. backflow towards the inlet. Pressurisation of fluid within the passageway (16) on the inlet (18) side of the diaphragm (14), deflects the diaphragm to open the aperture (22) so that fluid can flow through the passageway from the inlet (18) to the outlet (20) only. A membrane permeable in one direction only can also be made from a panel or sheeting incorporating many such collapsible non-return duckbill valves on the surface of the panel or sheet.

15 Claims, 15 Drawing Sheets

U.S. PATENT DOCUMENTS

| | | | | |
|---|---|---|---|---|
| 3,903,942 A | * | 9/1975 | Vest | 137/846 |
| 4,240,630 A | * | 12/1980 | Hoffman | 137/846 |
| 4,327,912 A | | 5/1982 | Hoffman | |
| 4,425,934 A | * | 1/1984 | Scheffer | 137/846 |
| 4,426,062 A | | 1/1984 | Bowron | |
| 4,729,401 A | * | 3/1988 | Raines | 137/512 |
| 4,752,287 A | | 6/1988 | Kurtz et al. | |
| 5,372,487 A | * | 12/1994 | Pekar | 137/846 |
| 5,915,407 A | | 6/1999 | West | |
| 6,089,260 A | * | 7/2000 | Jaworski et al. | 137/512 |
| 6,453,941 B1 | * | 9/2002 | Milhas et al. | 137/515 |

FOREIGN PATENT DOCUMENTS

| | | |
|---|---|---|
| DE | 198 00 796 A1 | 7/1999 |
| EP | 0 167 274 A2 | 1/1986 |
| FR | 387 674 A | 5/1931 |
| GB | 4267876 | 4/1935 |
| GB | 2094443 A | 9/1982 |
| GB | 2 298 027 A | 8/1996 |
| JP | 10295853 A | 11/1998 |
| WO | WO 83/02320 | 7/1983 |
| WO | WO 98/01689 | 1/1998 |

\* cited by examiner

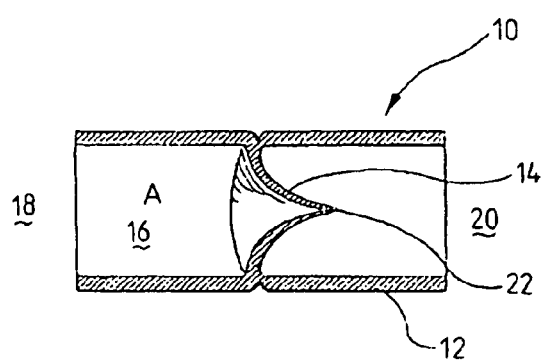
Fig. 3A
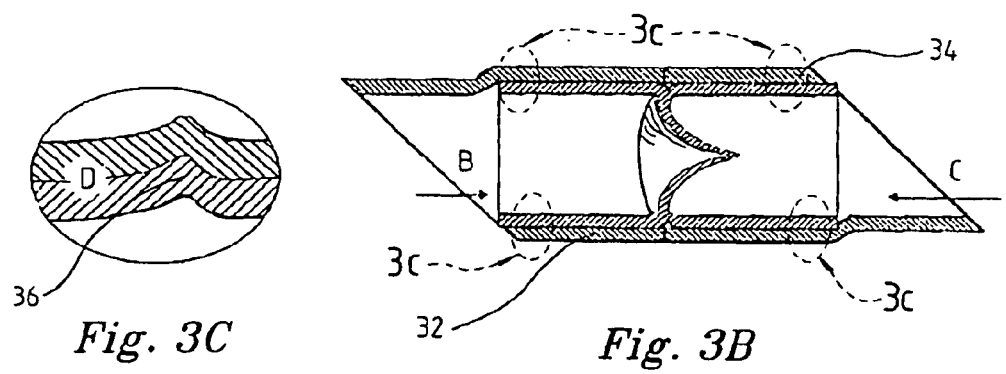
Fig. 3C
Fig. 3B

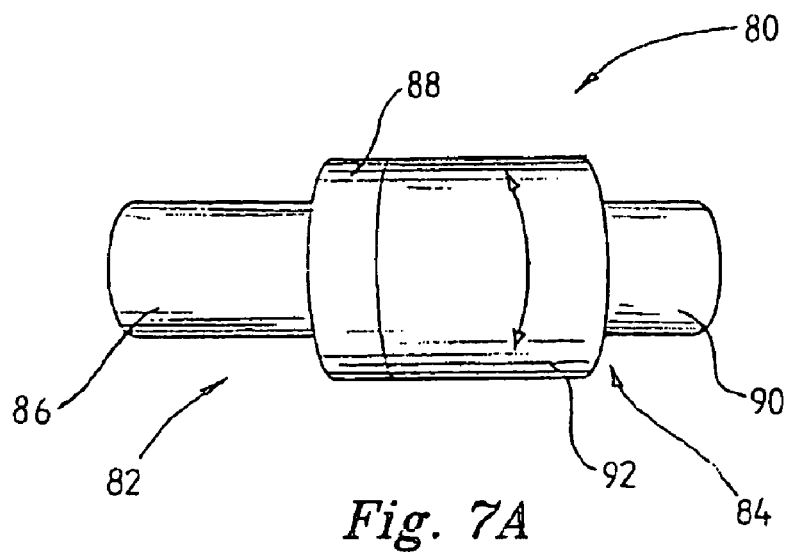
*Fig. 7A*
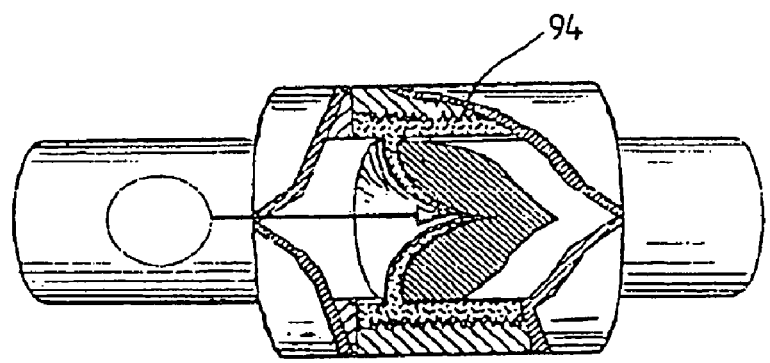
*Fig. 7B*
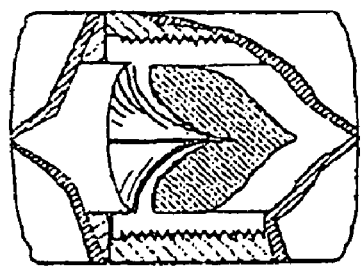 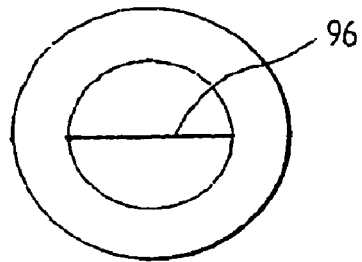
*Fig. 7C*        *Fig. 7D*

NON-RETURN VALVE

FIELD OF THE INVENTION

The present invention relates generally to a non-return valve such as that used on a pneumatic tyre, and a membrane being permeable in one direction only.

BACKGROUND TO THE INVENTION

Non-return valves are common in industrial and domestic applications and are particularly prolific on pneumatic tyres. FIG. 1 illustrates the various components of a conventional pneumatic non-return valve 1. The valve 1 comprises an inlet casing 2 which is screw threaded within a valve stem of a tyre (not shown). The inlet casing 2 houses a shaft 3 along which a valve member 4 slidably moves. The valve member 4 is biased against a seat 5 of the casing 2 under the force of a compression spring 6 so as to close the valve 1. A spring retainer 7 is connected to an end of the shaft 3 so as to retain the compression spring 6. Pressurisation of the non-return valve 1 releases the valve member 4 from the seat 5 to allow filling of the tyre.

The conventional pneumatic non-return valve 1 suffers from at least the following problems:

i) the valve 1 has a relatively large number of components which may require periodic servicing and maintenance;

ii) the valve 1 is expensive including relatively complex machined components; and iii) the valve is complicated in operation and thus in operation may be susceptible to failure.

SUMMARY OF THE INVENTION

According to one aspect of the present invention there is provided a non-return valve comprising:

a valve body including a fluid passageway which defines a fluid inlet and a fluid outlet located on a low pressure and a high pressure side of the valve, respectively, the fluid passageway being adapted to allow a flow of fluid from the inlet to the outlet; and a valve diaphragm in the form of a conical-shaped diaphragm having a collapsible aperture located at or adjacent its apex which is orientated in a downstream flow direction and directed toward the high pressure side of the valve, said diaphragm being connected across the fluid passageway and being constructed of a resiliently flexible material wherein the diaphragm itself initiates closure of the collapsible aperture, said closure being further promoted by fluid on the high pressure side of the valve to thus prevent fluid flowing in a reverse direction toward the inlet whereas the application of pressure, exceeding atmospheric pressure and that on the high pressure side, to an inlet side of the diaphragm deflects the diaphragm to expose the aperture and allow fluid to flow through the passageway from the inlet to the outlet only.

Typically the pressure is imposed on the inlet side of the diaphragm via a fluid nozzle which is designed to be retractably received within the passageway.

Generally the fluid is a liquid such as petrol and the non-return valve serves to prevent a reverse flow or escape of vapours.

Preferably the valve body is designed to fit to a reservoir or tank in which fluid is to be dispensed via the fluid nozzle. For example, the non-return valve is configured to fit to a petrol tank.

According to a further aspect of the present invention there is provided a non-return valve including a bank or series of non-return valves of similar construction coupled to one another, each of said non-return valves comprising:

a valve body including a fluid passageway which defines a fluid inlet and a fluid outlet, the fluid passageway being adapted to allow a flow of fluid from the inlet to the outlet; and a valve diaphragm being connected across the fluid passageway and including a collapsible aperture, the valve diaphragm being constructed of a resiliently flexible material and being configured wherein the diaphragm itself in a collapsed condition effects closure of the collapsible aperture to prevent fluid flowing in a reverse direction toward the inlet whereas pressure imposed on an inlet side of the diaphragm deflects the diaphragm to expose the aperture and allow fluid to flow through the passageway from the inlet to the outlet only.

Generally the non-return valves are coupled together with their respective valve bodies at least partly nested within one another wherein said valves are co-axially aligned. Alternatively the non-return valves are each of the same construction and configured to abut or engage one another with their valve bodies in alignment.

Preferably each of the diaphragms is formed integral with the corresponding valve body. More preferably the diaphragms are each in the form of a generally conical-shaped diaphragm having the collapsible aperture located at or adjacent its apex which is orientated in a downstream flow direction.

Generally said actuating means is a fluid nozzle which is retractably inserted into at least one of the collapsible apertures to permit a flow of fluid across the corresponding diaphragm via the fluid nozzle.

Preferably the valve membrane is formed integral with the valve body.

Typically the valve membrane is constructed of a mouldable polymeric material. More typically the polymeric material is an elastomer such as a rubber material. Alternatively the polymeric material is a nylon-based material.

Preferably the valve body is configured to retrofit to an existing valve stem. Alternatively the valve body is designed to be sealably inserted into a flow line.

Generally the fluid is water or compressed air.

According to yet a further aspect of the present invention there is provided a membrane being permeable in one direction only, said membrane comprising a panel or blanket of collapsible diaphragms each including a collapsible aperture and being constructed of a resiliently flexible material which is configured wherein each of the diaphragms themselves effects closure of the collapsible aperture to prevent fluid flowing in a reverse direction whereas pressure imposed on an upstream side of the membrane deflects one or more of the diaphragms to expose the corresponding aperture and allow fluid to flow across the membrane in said one direction only.

Generally the membrane is multi-layered with a series of said panels or blankets formed adjacent one another.

BRIEF DESCRIPTION OF THE DRAWINGS

In order to facilitate a better understanding of the nature of the present invention several embodiments of a non-return valve and a membrane being permeable in one direction only will now be described, by way of example only, with reference to the accompanying drawings in which:

FIGS. 3A, 3B, and 3C illustrate a general assembly of another embodiment of the invention suitable for use with irrigation tubing;

FIGS. 7A, 7B, and 7C illustrate an elevational and part cutaway view of a tool suitable for moulding of the non-return valve;

DETAILED DESCRIPTION OF THE PREFERRED EMBODIMENTS

Figure 1:
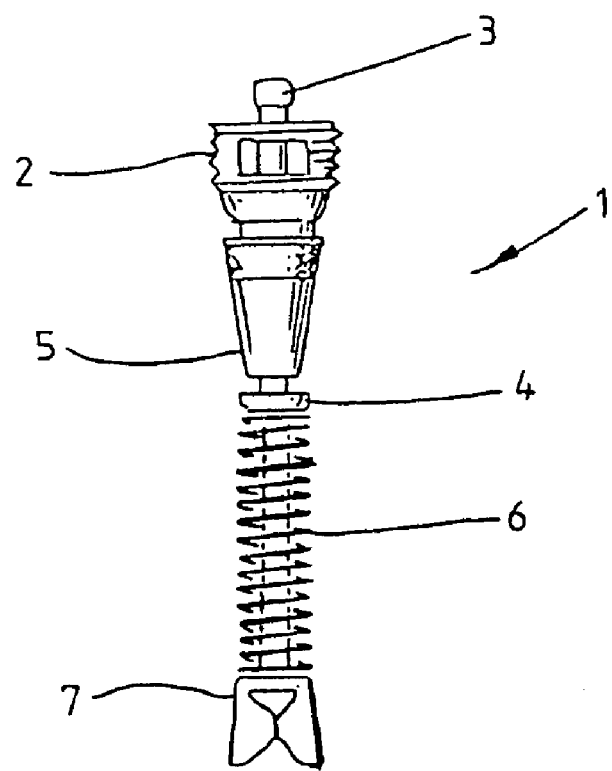
FIG. 1 is a general assembly of a conventional pneumatic non-return valve.

As shown in FIGS. 2A, 2B, 2C to 5A, 5B there are various embodiments of a non-return valve shown generally as 10 constructed in accordance with one aspect of the invention. For ease of reference and in order to avoid repetition like components have been designated with the same reference numerals.

In each example the non-return valve 10 comprises a valve body 12 and a valve membrane 14. The valve body 12 is generally tubular and includes an elongate passageway 16 having an inlet and an outlet defined at its opposing ends 18 and 20, respectively.

The non-return valve 10 of these embodiments is moulded from a polymeric material, preferably an elastomer such as rubber or a nylon-based material. The selection of the appropriate material for the valve 10 will be obvious to one skilled in the art without trial and experimentation. The valve membrane 14 is in the form of a conical-shaped diaphragm formed integral with the tubular valve body 12. The diagram 14 is configured as a generally conical-shaped element having a collapsible opening or aperture 22 located at or adjacent its apex. The conical diaphragm 14 is orientated with its apex in a downstream flow direction. The resiliently flexible material from which the diaphragm 14 is constructed ensures that the diaphragm 14 in a collapsed condition obstructs or closes the aperture 22 to prevent fluid flowing in a reverse direction toward the inlet 18. On the other hand, pressurisation of fluid within the passageway 16 on the inlet side of the diaphragm 14 deflects the diaphragm 14 to expose the aperture 22. Thus, with the aperture 22 exposed fluid is allowed to flow through the passageway 16 from the inlet 18 to the outlet 20 only. As illustrated, valve membrane or diaphragm 14 has a wall thickness that tapers towards the apex of diaphragm 14 and also bulges inwardly, i.e., is of an inward curvature, rather than being purely conical.

Figure 2A:
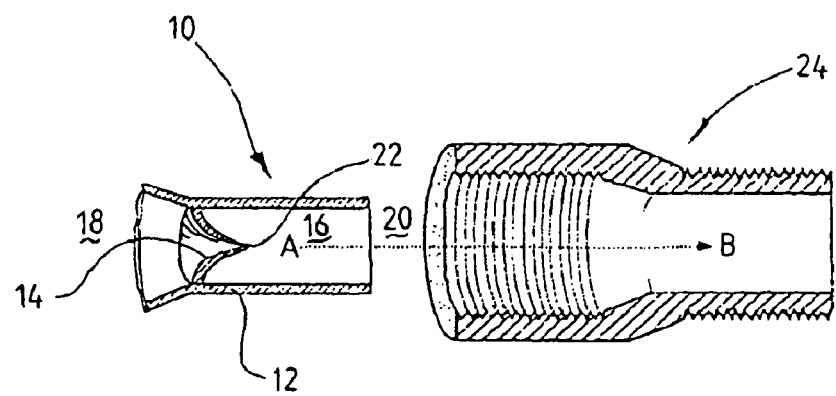
FIGS. 2A, 2B, and 2C illustrate three stages in the general assembly of a non-return valve according to one embodiment of the invention.
Figure 2B:
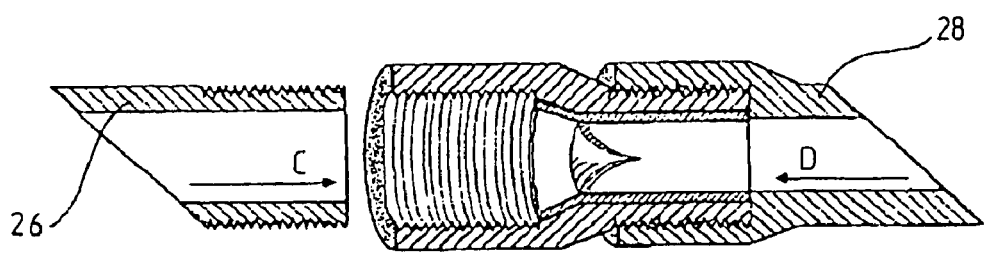
Figure 2C:
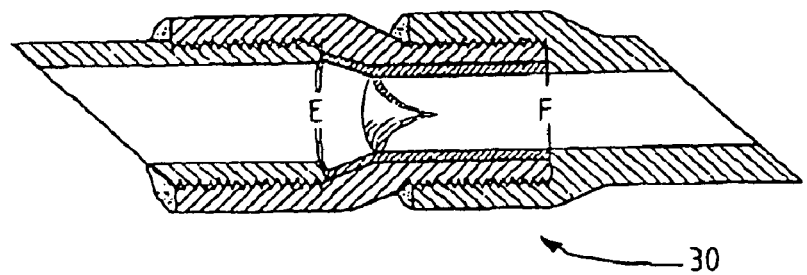

FIGS. 2A, 2B, 2C to 5A, 5B depict installation of variations on the non-return valve 10 in various applications. The non-return valve 10 of FIG. 2 is flared at its inlet 18 and is configured to seat within an internally and externally threaded nipple 24. An externally threaded conduit 26 and an internally threaded conduit 28 then threadably engage the respective male/female threaded nipple 24 so as to form a mated union shown generally as 30. The mated union 30 is designed so that sufficient compression is applied to the valve body 12 to seal it within the nipple 24. It will be appreciated that the non-return valve 10 can be adapted to suit any standard and pre-existing plumbing components such as the threaded nipple 24 and conduits 26 and 28 described.

FIG. 3 shows another non-return valve 10 which in this embodiment is suitable as a "slip on union" such as that used with adjacent lengths of irrigation tubing such as 32 and 34. In this example the tubing 32 and 34 is expanded over respective ends of the tubular valve body 12. As indicated in enlarged detail one or more barbs such as 36 may be included in the valve body 12 to both provide firm engagement with and enhance the seal between the tube 32 and 34 and the valve body 12. Fitting of the polyethylene tube 32 or 34 to the valve 10 may involve heating of the tubing to improve its pliability. The tubing 32 or 34 will naturally cool under ambient conditions after it has been slipped over the valve body 12.

Figure 4A:
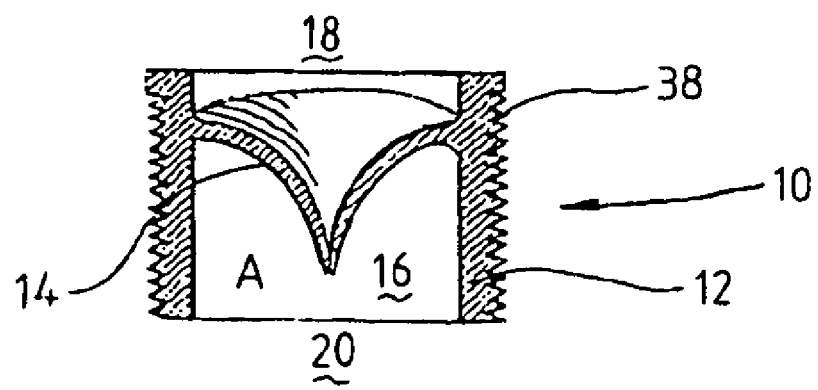
FIGS. 4A and 4B illustrate a general assembly of a further embodiment of a non-return valve of the invention suitable for use in pneumatic tyres.
Figure 4B:
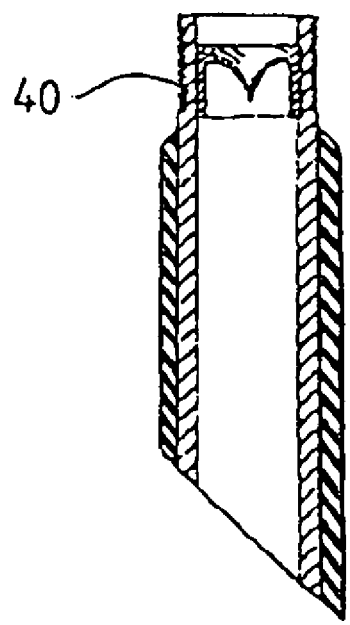

FIGS. 4A and 4B show another variant of the non-return valve 10 which may be substituted for the conventional pneumatic non-return valve 1. In this embodiment the valve body 12 is provided with an external thread 38 for securing the valve 10 within a stem 40 The stem 40 is preferably that of the conventional pneumatic non-return valve 1.

Figure 5A:
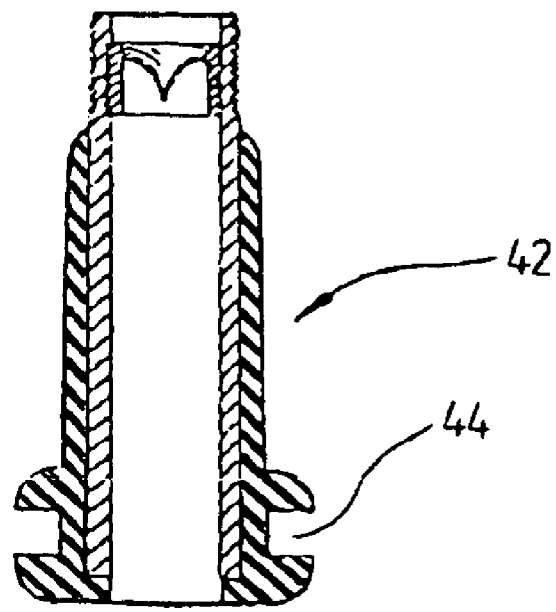
FIGS. 5A and 5B illustrate an assembly of a non-return valve of yet another embodiment of the invention suitable for tubeless pneumatic tyres.
Figure 5B:
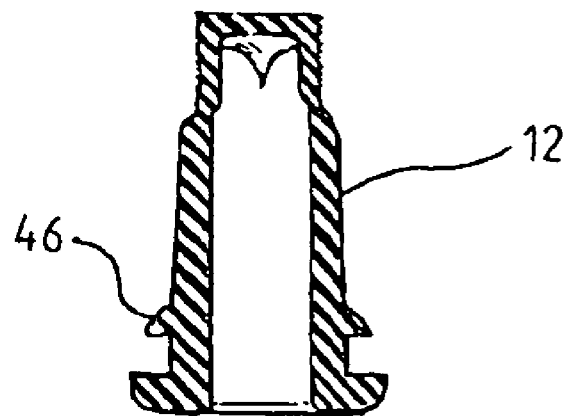

FIGS. 5A and 5B show installation of the non-return valve 10 of FIGS. 4A and 4B in a pneumatic tyre of a tubeless configuration. The valve stem 40 is located in a conventionally fabricated rubber casing 42 which includes an annular channel 44 in which a wheel rim is seated. Alternatively, the rubber casing may be formed integral with the non-return valve 10 in this example the height of the rubber casing 42 or valve body 12 is reduced so that it is stiffened for insertion into the wheel rim. Furthermore, an inner lip 46 of the casing or valve body 12 is reduced in sectional size and profile so as to assist in seating of the channel 44 about the rim.

Figure 6A:
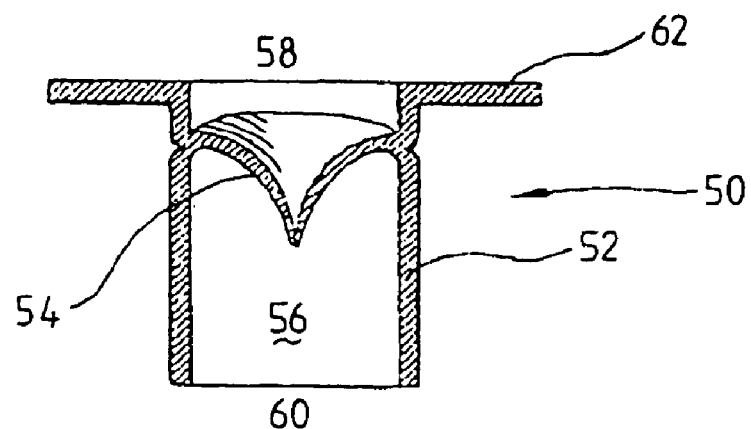
FIGS. 6A and 6B illustrate a general assembly of a non-return valve of another aspect of the invention.
Figure 6B:
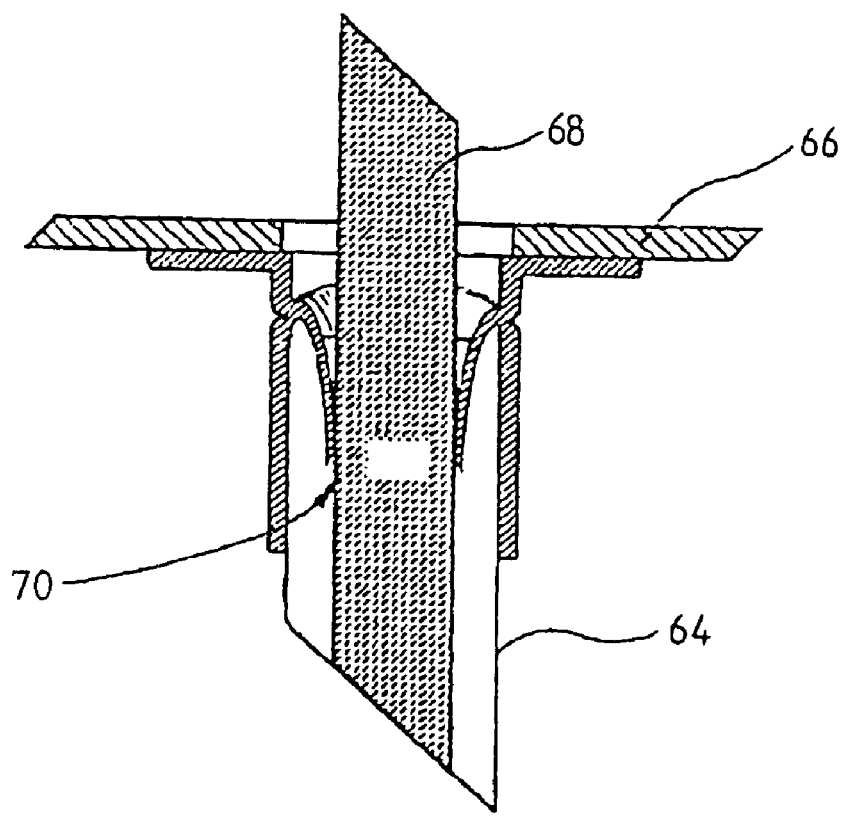

FIG. 6 illustrates one example of a non-return valve 50 according to another aspect of the invention. The non-return valve 50 is similar in construction to those described above with a tubular valve body 52 and a conical-shaped diaphragm 54. The tubular body 52 includes a passageway 56 defining an inlet and outlet 58 and 60 either side of the diaphragm 54. The diaphragm 54 is formed integral with the valve body 52 and fabricated or moulded from resiliently flexible polymeric materials.

In this particular construction of the non-return valve 50 an annular flange 62 is provided at the inlet end of the valve body 52. The valve body 52 fits about a filler tube 64 of a fuel tank and the flange 62 provides a seal against a panel 66 of a motor vehicle (not shown). In use, a filler nozzle 68 is retractably received within the valve 10 so as to deflect the diaphragm 54 to permit a flow of gasolene into the fuel tank via the nozzle 68. Thus, the diaphragm 54 is resiliently deformed so as to expose a collapsible opening 70 through which the nozzle 68 passes. Importantly, the diaphragm 54 forms about the nozzle 68 to prevent the escape of gasoline vapours from the filler tube 64 or tank. When the nozzle is retracted from the valve 50 the valve membrane 54 returns to its collapsed condition wherein it obstructs or closes the collapsible opening 70. Thus, in the collapsed condition fuel vapour is prevented from escaping the tank or flowing in a reversed direction toward the inlet 58.

FIGS. 7A, 7B, 7C, 7D to 9A, 9B schematically illustrate a moulding tool which is appropriate for forming a non-return valve such as 10 described above. The tool shown generally as 80 is designed for use in a conventional injection moulding machine.

The tool 80 includes two (2) mutually engagable die sections 82 and 84. Each of the die sections 82 and 84 includes a shaft and a collar 86/88 and 90/92, respectively. The shaft 86 and collar 88 of one of the die sections 82 is machined together whereas the collar 92 is allowed to rotate on the shaft 90 of the other die section 84. This allows for removal of the tool 80 from the external thread 38 of the non-return valve 10 of this example. The part cut-away view of FIGS. 7B and 7C shows in some detail the internal geometry of the tool 80 which defines an internal cavity 94 for injection of the polymeric material. Importantly, a relatively thin projection 96 is connected to the shaft 86 and extends across the apex of the resultant valve 10. This projection 96 thus forms or defines the collapsible opening or aperture 22 of the valve 10.

Figure 8A:
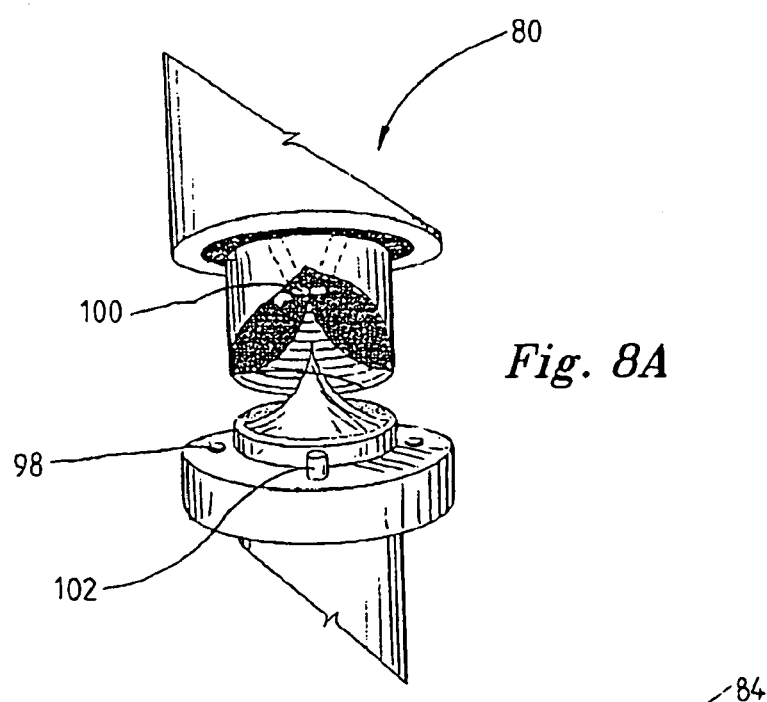
FIGS. 8A and 8B illustrate a part cutaway together with an enlarged view of the tool of FIG. 7.
Figure 8B:
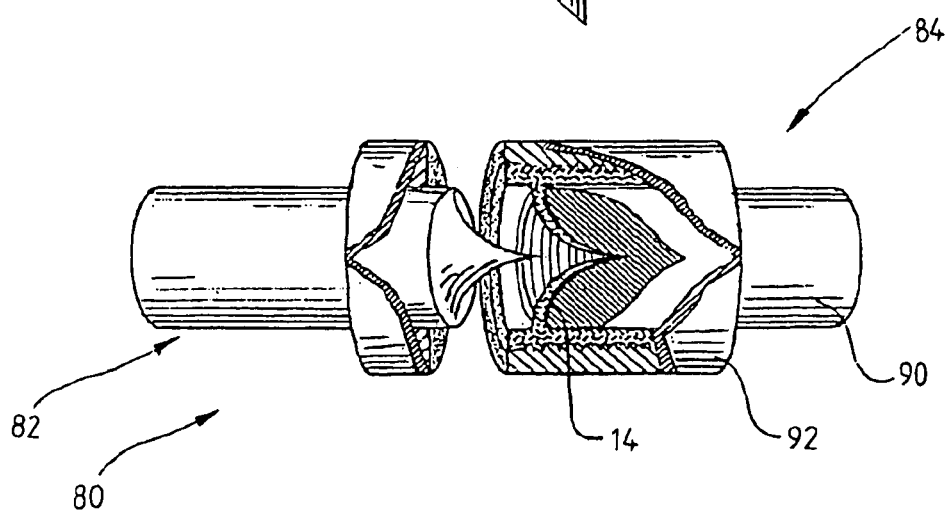
Figures 9A, 9B:
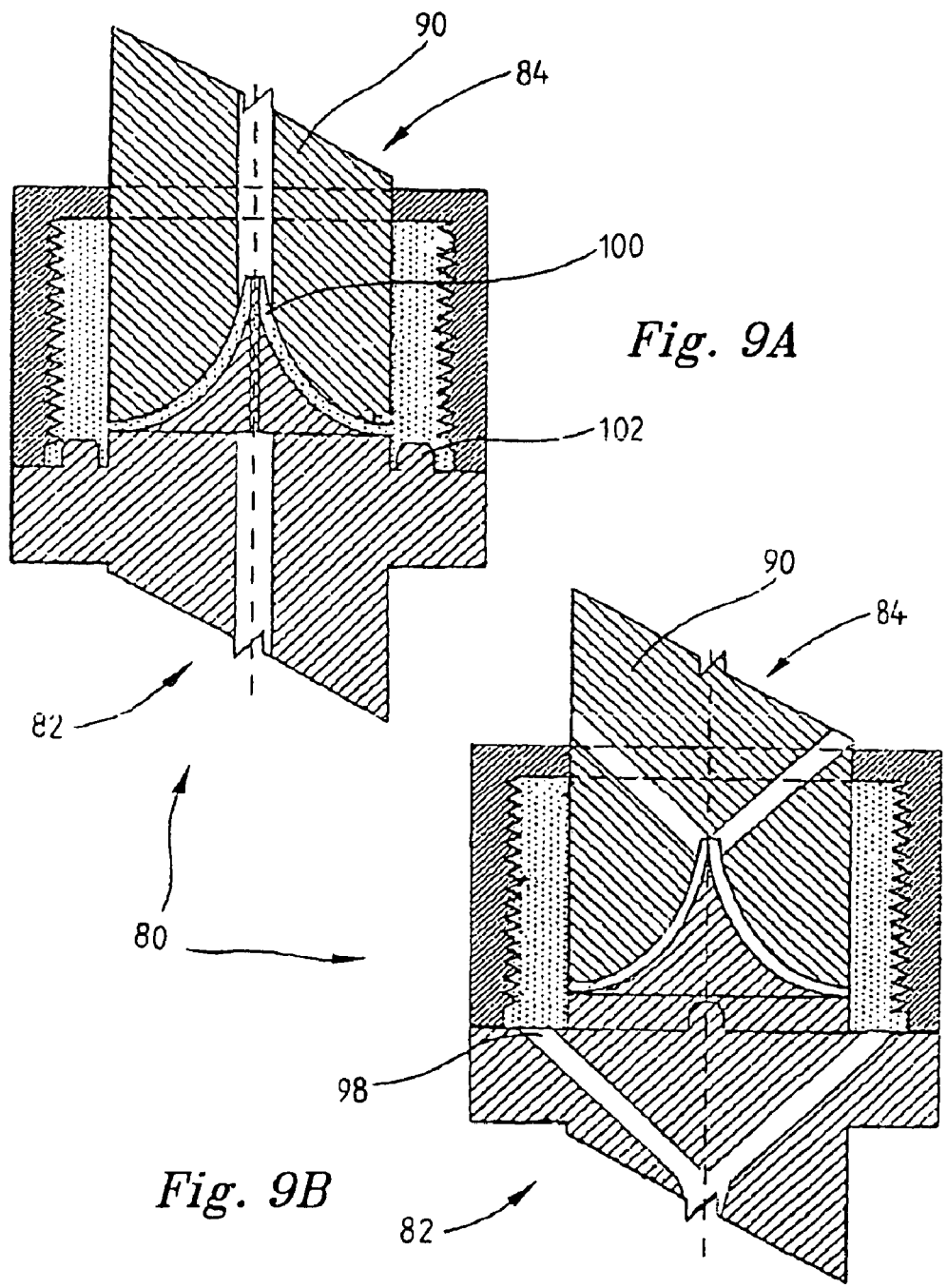
FIGS. 9A and 9B illustrate sectional views of the tool of FIGS. 7 and 8.

FIGS. 8A and 8B illustrate the tool 80 of FIGS. 7A, 7B, 7C and 7D in a retracted position with the die section 82 removed from the injected valve 10. The collar 92 of the other die section 84 is then rotated so as to release the injected valve 10 from the tool 80. As the injected polymer cools the membrane or diaphragm 14 is released from the shaft 90 of the other die section 84. However, the shaft 90 of the other die section 84 may also include a plunger or other means to assist or aid in removal of the injected valve 10. FIGS. 8A and 8B also depict injection and relief ports 98 and 100, respectively, which provide a flow of polymer to the die cavity 90. One of the die sections 82 or 84 may also include a dowel pin 102 for interengagement of the die sections 82 and 84. The injector ports 98 provide a discriminate point for polymer to be injected uniformly throughout the cavity 9C of the tool 80. The relief ports 100 allow an even flow and distribution of injected polymer throughout the die cavity 90.

Figure 10:
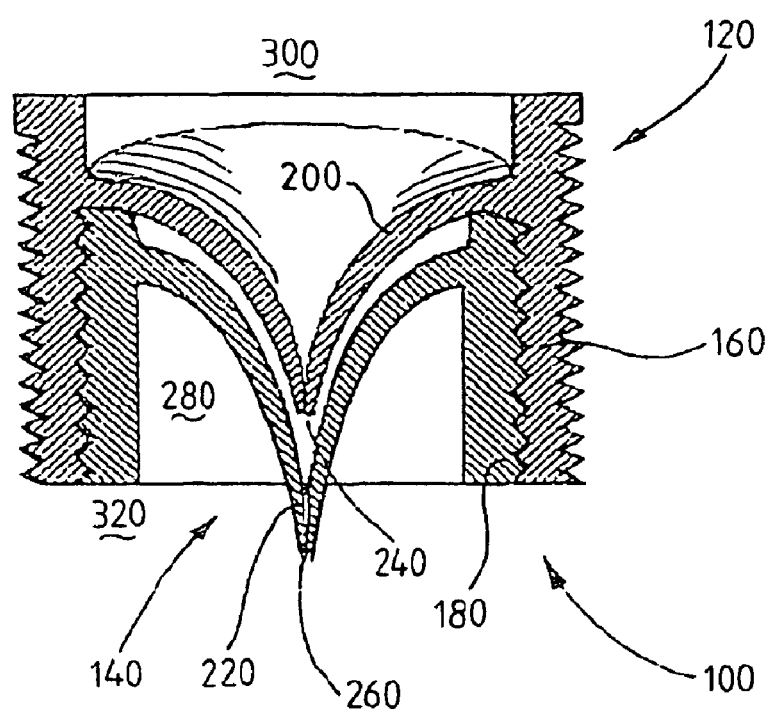
FIG. 10 illustrates three embodiments of a non-return valve according to a further aspect of the invention.

As shown in FIG. 10 there are three embodiments of a further aspect of a non-return valve 100 comprising a bank or series of non-return valves such as 120 and 140 of similar construction coupled to one another. The overall non-return valve 100 is thus of a "fail-safe" configuration. For ease of reference and in order to avoid repetition like components have been designated with the same reference numerals.

In this particular construction of the fail-safe non-return valve 100 each of the series of non-return valves such as 120 and 140 includes a valve body such as 160 or 180 together with a corresponding valve membrane such as 200 or 220. The valve bodies 160 or 180 are generally tubular and moulded together with the corresponding diaphragm 200 or 220 which is configured as a generally conical-shaped element. Importantly, the diaphragm 200 or 220 includes a collapsible aperture 240 or 260 formed at its apex. The conical diaphragm 200 or 220 is orientated with its apex in a downstream flow direction.

In this example the collapsible diaphragms 200 and 220 are moulded from a polymeric material, preferably an elastomer such as rubber or a nylon-based material. The particular shape of the diaphragm 200 or 220 together with the resilient material from which it is constructed ensures that the diaphragm 200 or 220 in a collapsed condition obstructs or closes the aperture 240 or 260 to prevent fluid flowing in an upstream direction. On the other hand, with pressure imposed on an upstream side of either of the diaphragms 200 or 220 said diaphragm is deflected to expose the corresponding collapsible aperture 240 or 260. Thus, with the collapsible apertures 240 or 260 exposed fluid is allowed to flow in a downstream direction through the fail-safe non-return valve 100.

FIG. 10 depicts two configurations of the fail-safe non-return valve 100 where either two non-return valves such as 120 and 140 are nested within one another or are of substantially the same configurations and merely abut one another. In the "nested" embodiment of the fail-safe non-return valve 100 the outer body 160 of the outer valve 120 is internally threaded and designed to engage the inner body 180 of the inner valve 140. In the other embodiment, adjacent valve bodies 160 and 180 are aligned with one another and may together be housed or contained within a valve casing (not shown). In both cases the valve diaphragms such as 200 and 220 are oriented such that their respective collapsible apertures 240 and 260 are aligned and coaxial with one another. An internal bore of the valve bodies 160 and 180 together defines a fluid passageway 280 of the non-return valve 100 including a fluid inlet 300 and outlet 320.

Figure 11A:
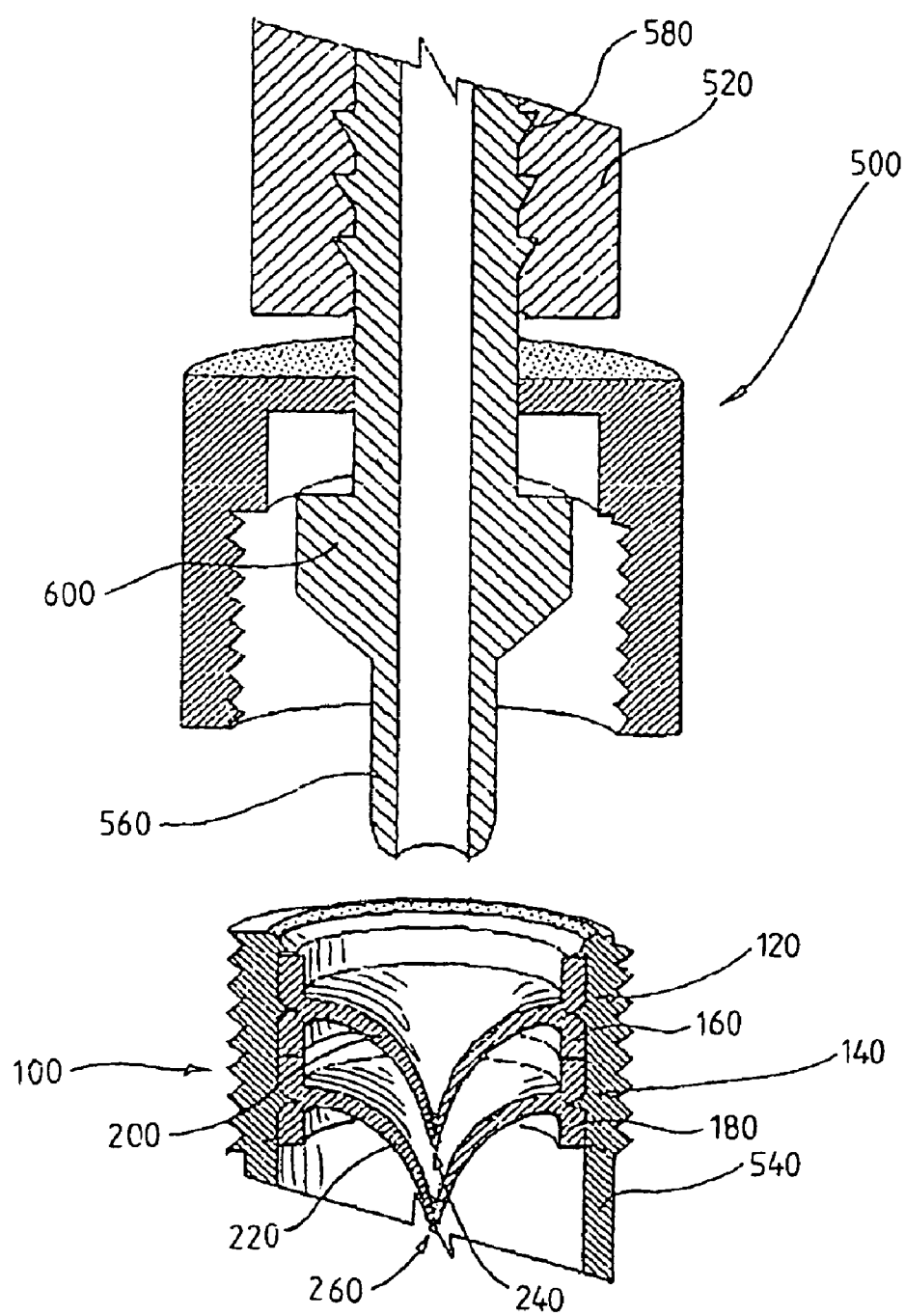
FIGS. 11A to 11C depict another embodiment of this aspect of a non-return valve incorporated in a quick connect coupling of a hydraulic line.
Figure 11B:
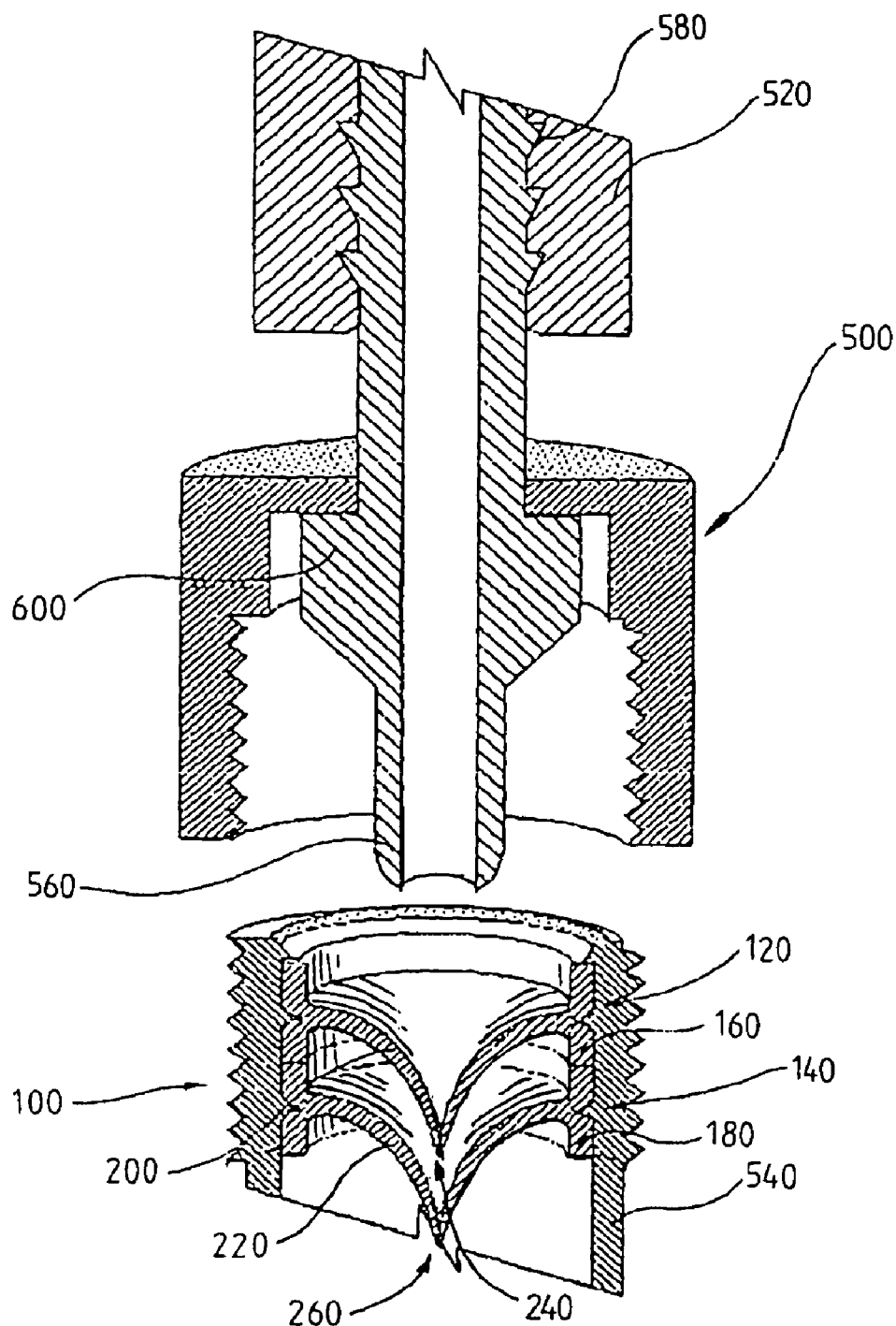
Figure 11C:
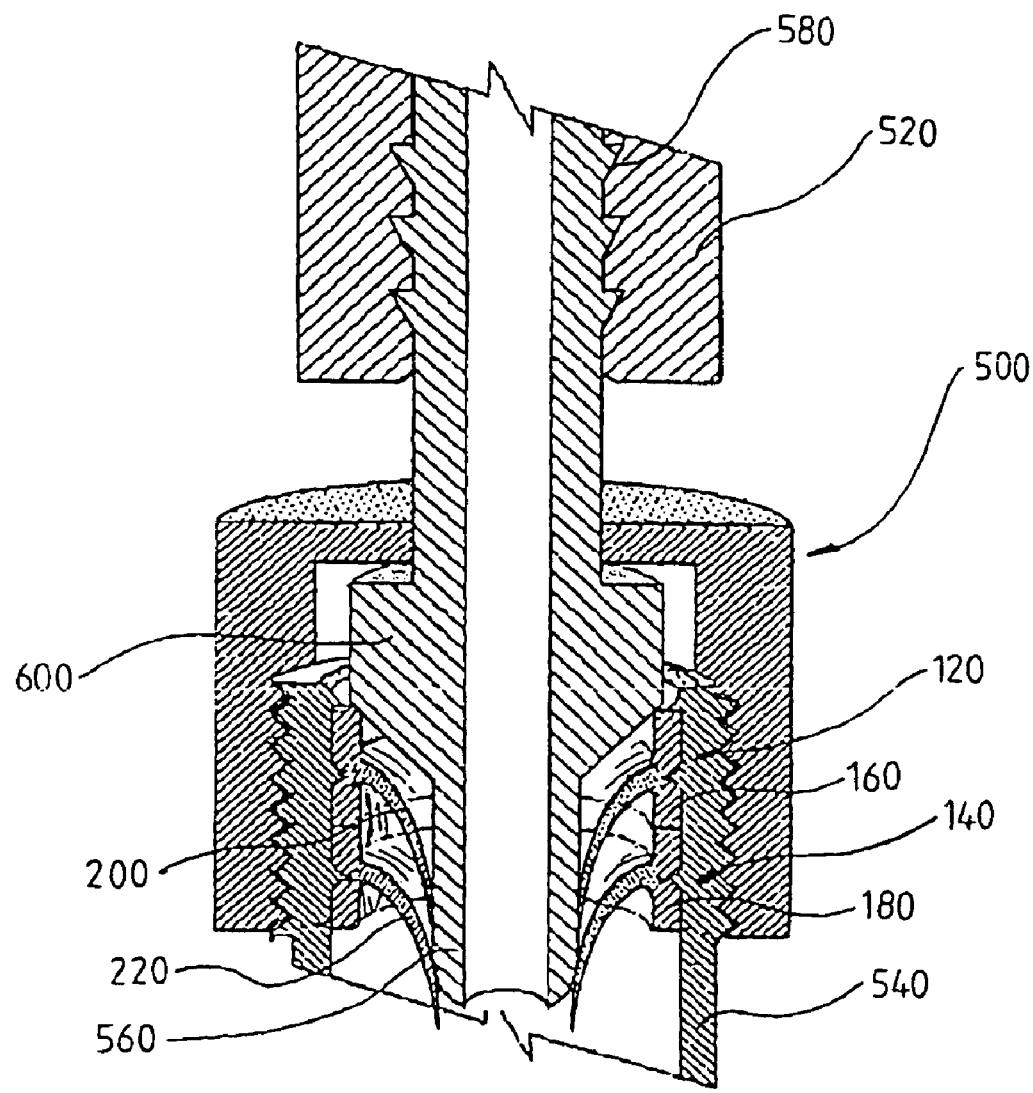

FIGS. 11A to 11C illustrate another aspect of a non-return valve according to the invention which in this embodiment is designed to be incorporated in a quick connect coupling shown generally as 500 of a hydraulic line or hose 520. The hydraulic coupling 500 is designed to threadably engage a valve casing 540 in which another embodiment of a non-return valve 1000 is mounted. For ease of reference and in order to avoid repetition components of this non-return valve 1000 which are similar to the non-return valve 10 or 100 described above are designated with an additional "0". For example, the diaphragms are designated as 200 and 2200.

In this application the valve diaphragms 200 and 220 are actuated not by fluid pressure but rather via a fluid nozzle which in this example is in the form of a fluid injector 560 which is connected to the hydraulic hose 520 via barbs 580 formed about a periphery of the injector 560. FIGS. 11A to 11C show the sequential steps involved in connecting the quick coupling 500 to the casing 540. The injector coupling 500 is initially slid longitudinally along the injector 560 until it abuts an annular flange 600 formed about the injector 560. The injector 560 is then pressed into engagement with the diaphragms 2000 and 2200 so as to expose their corresponding collapsible apertures 2400 and 2600. The coupling 500 is progressively threaded onto the casing 540 so as to drive the injector 560 into engagement with the diaphragms 2000 and 2200. Thus, in this example, hydraulic fluid or the like which is contained in the casing 540 and any associated plumbing is allowed to flow to the flexible hose 520 upon connection of the quick coupling 500. The nozzle 560 thus serves as the means for actuating the valve 1000 of this particular aspect of the invention.

Figure 12:
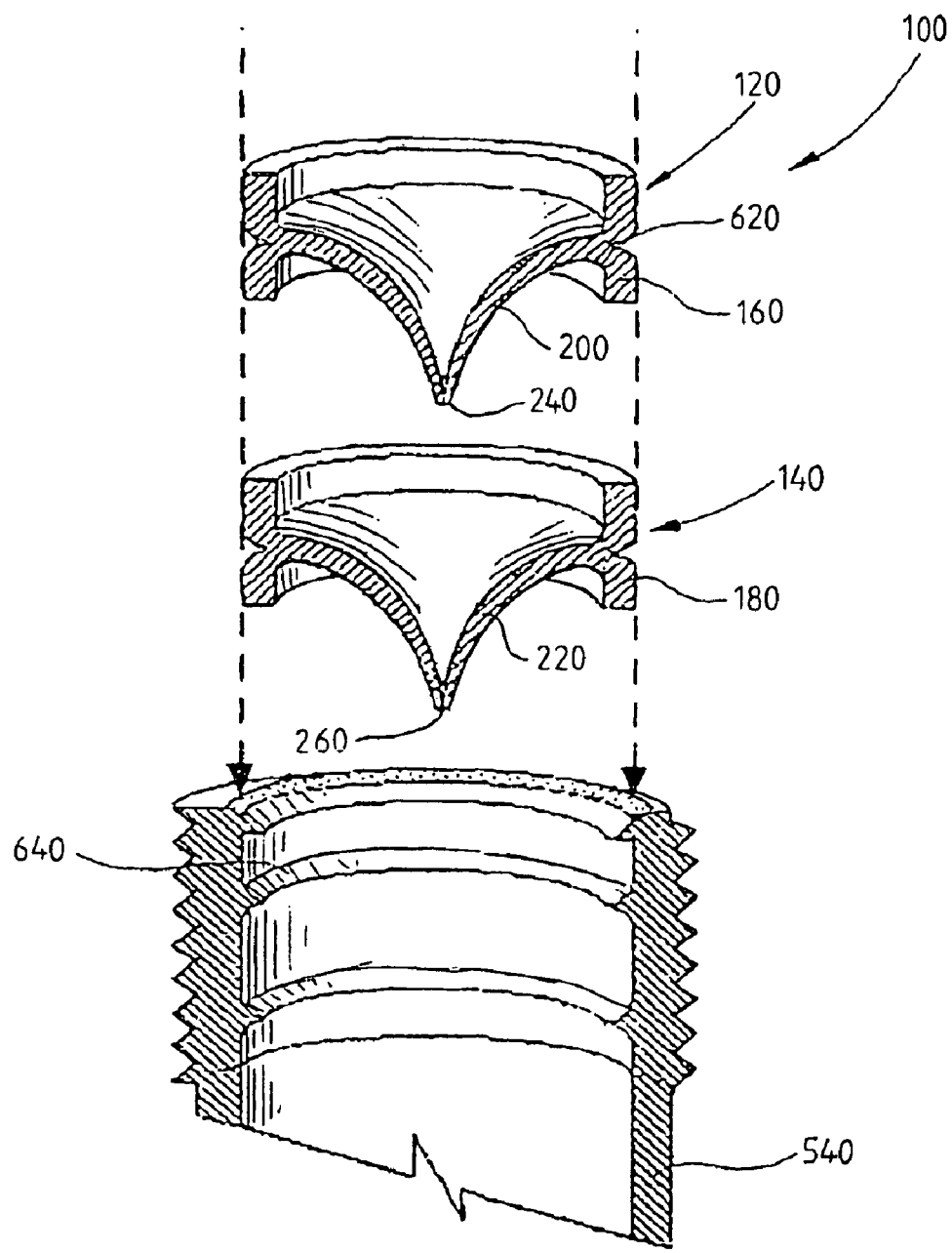
FIG. 12 is an exploded sectional view of various components of the non-return valve of FIGS. 11A to 11C.

FIG. 12 illustrates an exploded sectional view of the valve 1000 incorporated in the quick connect hydraulic coupling described. Each of the valve bodies 1200 and 1400 is designed to coaxially press-fit within the casing 540. Each body 1200 and 1400 includes an annular recess 620 being shaped complementary to and designed to be engaged by a corresponding ridge 640 formed circumferentially within an inner surface of the casing 540.

Figure 13:
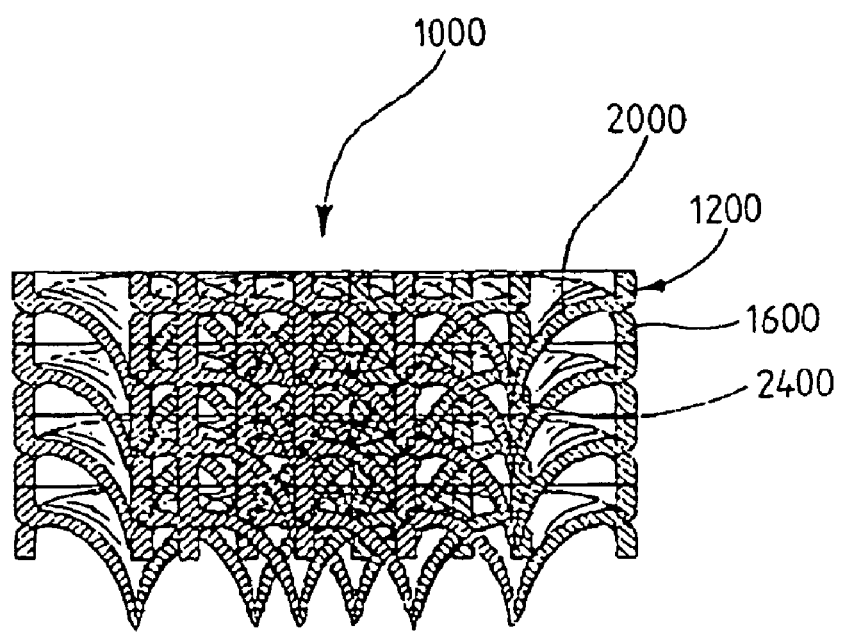
FIG. 13 is a sectional representation of a membrane according to yet another aspect of the invention being permeable in one direction only.

FIG. 13 depicts one example of a membrane 1000' of another aspect of the invention. The membrane 1000' is permeable in one direction only and on a microscopic scale may be applied as a means of repairing a lung. The membrane 1000' is multi-layered with a series of panels or blankets of collapsible diaphragms such as 2000' being formed alongside one another. In this embodiment each of the diaphragms such as 2000' includes a corresponding valve body 1600' which is formed integral with an adjacent valve body of an adjacent diaphragm. However, it should be appreciated that the membrane 1000' need not include this arrangement of valve bodies but rather may be limited to a panel or blanket of interconnected collapsible diaphragms. In any case the membrane 1000' functions along the same lines as the non-return valve 10 or 100 described above. That is, pressure imposed on an upstream side of the membrane 1000' deflects one or more of the diaphragms such as 2000' to expose its corresponding aperture 2400' to allow fluid to flow across the membrane 1000'. On the other hand, without a positive pressure imposed on the upstream side of the membrane 1000', the diaphragms such as 2000' are in a collapsed condition such that the collapsible apertures such as 2400' are closed to prevent the flow of fluid in a reverse direction across the membrane 1000'.

Now that several preferred embodiments of the various aspects of the present invention have been described in some detail it will be apparent to those skilled in the art that the non-return valve and permeable membrane have at least the following advantages:

(i) the non-return valve is relatively simple in construction;

(ii) the non-return valve is effective in operation relying on fluid pressure for opening, and valve membrane characteristics and design for closure; and (iii) the non-return valve is relatively inexpensive to manufacture.

Those skilled in the art will appreciate that the invention described herein is susceptible to variations and modifications other than those specifically described. For example, injection moulding is merely one exemplary technique of forming the non-return valves. the diaphragm may be constructed of practically any resiliently flexible material which in a collapsed condition obstructs the collapsible aperture to prevent flow across the valve or membrane. The non-return valves may extend to applications other than those described above. For example, the fail-safe non-return valve may be connected across the skin of a ships hull and provide a means of quick evacuation where the human body can slip through the dual or multiple diaphragm valves.

All such variations and modifications are to be considered within the scope of the present invention the nature of which is to be determined from the foregoing description.

The invention claimed is:

1. A non-return valve comprising:
   a valve body including a fluid passageway which defines a fluid inlet and a fluid outlet located on a low pressure and a high pressure side of the valve, respectively, the fluid passageway being adapted to allow a flow of fluid from the inlet to the outlet; and
   a valve diaphragm in the form of a conical-shaped diaphragm having a collapsible aperture comprising a slit which extends across the full width of the diaphragm and which passes through a region located at or adjacent an apex of the diaphragm which is orientated in a downstream flow direction and directed toward the high pressure side of the valve, said diaphragm being connected across the fluid passageway, and, excluding the slit, being rotationally symmetrical about a longitudinal axis which passes through said apex, said diaphragm tapering in wall thickness toward said apex and further being constructed of a resiliently flexible material wherein upon insertion of a nozzle through the collapsible aperture the diaphragm closes about the nozzle to prevent fluid escape whereas upon retraction of the nozzle the diaphragm itself initiates closure of the collapsible aperture, said closure being further promoted by fluid on the high pressure side of the valve to thus prevent fluid flowing in a reverse direction toward the inlet whereas the application of pressure using the nozzle, exceeding atmospheric pressure and that on the high pressure side, to an inlet side of the diaphragm deflects the diaphragm to expose the aperture and allow fluid to flow through the passageway from the inlet to the outlet only.

2. A non-return valve as defined in claim 1 wherein the valve body is designed to fit to a reservoir or tank in which fluid is to be dispensed via the fluid nozzle.

3. A non-return valve as defined in claim 1 wherein the valve membrane is formed integral with the valve body.

4. A non-return valve as defined in claim 1 wherein the valve membrane is constructed of a mouldable polymeric material.

5. A non-return valve as defined in claim 1 wherein the valve body is configured to retrofit to an existing valve stem.

6. A non-return valve as defined in claim 1 wherein the valve body is designed to be sealably inserted into a flow line.

7. A non-return valve as defined in claim 1 wherein the valve diaphragm is inwardly bulging.

8. A non-return valve including a bank or series of non-return valves of similar construction coupled to one another, each of said non-return valves comprising:
   a valve body including a fluid passageway which defines a fluid inlet and a fluid outlet, the fluid passageway being adapted to allow a flow of fluid from the inlet to the outlet; and
   a conical-shaped valve diaphragm having a collapsible aperture defined by a slit which extends across the full width of the diaphragm and passes through a region located at or adjacent to an apex of the diaphragm which is oriented in a downstream direction, and the diaphragm being connected across the fluid passageway and, excluding the slit, being rotationally symmetrical about a longitudinal axis which passes through said apex, the diaphragm tapering in wall thickness toward said apex and further being constructed of a resiliently flexible material wherein, upon insertion of a nozzle through the collapsible aperture, the diaphragm closes about the nozzle to prevent fluid escape whereas, upon retraction of the nozzle, the diaphragm itself, in a collapsed condition, effects closure of the collapsible aperture to prevent fluid flowing in a reverse direction toward the inlet whereas pressure imposed, using the nozzle, on an inlet side of the diaphragm deflects the diaphragm to expose the aperture and allow fluid to flow through the passageway from the inlet to the outlet only.

9. A non-return valve as defined in claim 8 wherein the non-return valves are coupled together with their respective valve bodies at least partly nested within one another wherein said valves are co-axially aligned.

10. A non-return valve as defined in claim 8 wherein the non-return valves are each of the same construction and configured to abut or engage one another with their valve bodies in alignment.

11. A non-return valve as defined in claim 8 wherein the diaphragms are each in the form of a generally conical-shaped diaphragm having the collapsible aperture located at or adjacent its apex which is orientated in a downstream flow direction.

12. A non-return valve as defined in claim 8 wherein the valve diaphragm is inwardly bulging.

13. A membrane being permeable in one direction only, said membrane comprising a panel or blanket of collapsible diaphragms each including a collapsible aperture and being constructed of a resiliently flexible material which is configured wherein each of the diaphragms themselves effects closure of the collapsible aperture to prevent fluid flowing in a reverse direction whereas pressure imposed on an upstream side of the membrane deflects one or more of the diaphragms to expose the corresponding aperture and allow fluid to flow across the membrane in said one direction only.

14. A membrane as defined in claim 13 wherein the membrane is multi-layered with a series of said panels or blankets formed adjacent one another.

15. A non-return valve comprising:
   a valve body including a fluid passageway which defines a fluid inlet and a fluid outlet located on a low pressure and a high pressure side of the valve, respectively, in a closed state of the valve; and a valve diaphragm having both an inlet and an outlet side, being conically shaped and having a collapsible aperture defined by a slit which extends across the full width of the diaphragm and intersects an apex of the diaphragm, wherein the fluid passageway and the valve diaphragm, upon insertion of a nozzle through the collapsible aperture, allow a flow of fluid through the nozzle in a downstream flow direction only from the inlet to the outlet, said apex being orientated in the downstream flow direction and being directed toward the high pressure side of the valve in its closed state, and said diaphragm being connected across the fluid passageway and being constructed of a resiliently flexible material tapering in wall thickness towards its apex wherein, upon insertion of the nozzle though the collapsible aperture, the diaphragm sealingly forms about the nozzle and wherein, upon retraction of the nozzle, the diaphragm itself initiates closure of the collapsible aperture.

* * * * *

UNITED STATES PATENT AND TRADEMARK OFFICE
CERTIFICATE OF CORRECTION

PATENT NO. : 7,028,981 B2  Page 1 of 1
APPLICATION NO. : 10/018056
DATED : April 18, 2006
INVENTOR(S) : HORTON It is certified that error appears in the above-identified patent and that said Letters Patent is hereby corrected as shown below:

On the title page (22) the PCT Filed date "Dec. 14, 2001" should read
-- June 14, 2000 --.

Signed and Sealed this

Eighth Day of August, 2006

JON W. DUDAS
*Director of the United States Patent and Trademark Office*